US008719956B2

(12) United States Patent
Huang et al.

(10) Patent No.: US 8,719,956 B2
(45) Date of Patent: May 6, 2014

(54) METHOD AND APPARATUS FOR SHARING LICENSES BETWEEN SECURE REMOVABLE MEDIA

(71) Applicant: Huawei Technologies Co., Ltd., Shenzhen (CN)

(72) Inventors: Chen Huang, Shenzhen (CN); Renzhou Zhang, Shenzhen (CN); Zhipeng Zhou, Shenzhen (CN); Weizhong Yuan, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 0 days.

(21) Appl. No.: 13/719,681

(22) Filed: Dec. 19, 2012

(65) Prior Publication Data
US 2013/0111604 A1 May 2, 2013

Related U.S. Application Data

(63) Continuation of application No. 12/982,350, filed on Dec. 30, 2010, which is a continuation of application No. PCT/CN2009/071721, filed on May 11, 2009.

(30) Foreign Application Priority Data

Jul. 29, 2008 (CN) .......................... 2008 1 0134766

(51) Int. Cl.
*G06F 21/00* (2013.01)
(52) U.S. Cl.
USPC ................................ 726/31; 726/32; 726/33
(58) Field of Classification Search
USPC ................................ 726/31, 32, 33
See application file for complete search history.

(56) References Cited

U.S. PATENT DOCUMENTS

| 7,779,479 | B2 * | 8/2010 | Lee et al. ......................... 726/27 |
| 7,937,750 | B2 * | 5/2011 | Mahalal et al. .................... 726/9 |
| 7,984,506 | B2 * | 7/2011 | Ueno et al. ....................... 726/26 |
| 8,161,103 | B2 * | 4/2012 | Lee ................ 709/203 |
| 8,256,009 | B2 * | 8/2012 | Kim et al. ......................... 726/27 |
| 8,359,654 | B2 * | 1/2013 | Rave et al. ........................ 726/26 |
| 8,510,854 | B2 * | 8/2013 | Kim et al. ......................... 726/27 |
| 8,554,927 | B2 * | 10/2013 | Lee et al. ........................ 709/228 |
| 2005/0149340 | A1 | 7/2005 | Murakami et al. |
| 2005/0210249 | A1 | 9/2005 | Lee et al. |
| 2005/0268098 | A1 * | 12/2005 | Oh et al. ........................ 713/168 |

(Continued)

FOREIGN PATENT DOCUMENTS

CN 1692340 A 11/2005
CN 10186752 12/2007

(Continued)

OTHER PUBLICATIONS

Dolgunov, Boris; "Enabling Optimal Security for Removable Storage Devices"; Fourth International IEEE Security in Storage Workshop, Sep. 27, 2007, pp. 15-21.*

(Continued)

*Primary Examiner* — Victor Lesniewski
(74) *Attorney, Agent, or Firm* — Huawei Technologies Co., Ltd.

(57) ABSTRACT

A method and an apparatus for moving a license between SRMs. A DRM agent obtains the license from a first SRM, and sets the license to a forwarding state locally; the DRM agent deducts one permission of moving the license; and the DRM agent sends the license to a second SRM.

9 Claims, 10 Drawing Sheets

(56) References Cited

U.S. PATENT DOCUMENTS

| | | | |
|---|---|---|---|
| 2005/0268346 A1* | 12/2005 | Lee et al. | 726/27 |
| 2006/0059094 A1* | 3/2006 | Oh et al. | 705/51 |
| 2006/0155651 A1* | 7/2006 | Oh et al. | 705/57 |
| 2007/0157318 A1* | 7/2007 | Lee et al. | 726/27 |
| 2007/0172065 A1* | 7/2007 | Lee et al. | 380/259 |
| 2008/0046271 A1* | 2/2008 | Jeong et al. | 705/1 |
| 2008/0047006 A1* | 2/2008 | Jeong et al. | 726/21 |
| 2008/0072296 A1* | 3/2008 | Bensimon et al. | 726/4 |
| 2008/0103977 A1 | 5/2008 | Khosravy et al. | |
| 2008/0127177 A1* | 5/2008 | Oh et al. | 717/174 |
| 2008/0155260 A1* | 6/2008 | Perez et al. | 713/169 |
| 2008/0163336 A1 | 7/2008 | Feng et al. | |
| 2008/0163377 A1* | 7/2008 | Lee et al. | 726/26 |
| 2008/0313085 A1* | 12/2008 | Kravitz et al. | 705/54 |
| 2009/0158437 A1* | 6/2009 | Kim et al. | 726/26 |
| 2009/0172400 A1* | 7/2009 | Rave et al. | 713/169 |
| 2009/0193523 A1* | 7/2009 | Abu-Amara | 726/26 |
| 2010/0146637 A1* | 6/2010 | Lee | 726/26 |
| 2010/0192232 A1* | 7/2010 | Lee | 726/26 |

FOREIGN PATENT DOCUMENTS

| | | |
|---|---|---|
| CN | 101317380 | 12/2008 |
| KR | 10-2008-0029766 | 4/2008 |
| WO | 2007/092658 | 8/2007 |

OTHER PUBLICATIONS

Lee, Byung Rae, *Mobile Broadcast DRM Based on User Identity Card*, EURASIP Journal, vol. 2007 (9 pp.).

*Enabler Validation Plan for Secure Removable Media*, Open Mobile Alliance, Candidate Version 1.0, Apr. 28, 2008 (25 pp.).

Written Opinion of the International Searching Authority, dated Aug. 11, 2009, in corresponding International Application No. PCT/CN2009/071721 (5 pp.).

International Search Report, mailed Aug. 20, 2009, in corresponding International Application No. PCT/CN2009/071721(8 pp.).

Extend European Search Report, dated Jul. 11, 2011, in corresponding European Application No. 09802362.5 (6 pp.).

Office Action, dated Sep. 26, 2011, in corresponding Chinese Application No. 200810134766.3 (13 pp.).

Communication pursuant to Article 94(3) EPC, dated Sep. 11, 2012, in corresponding European Application No. 09802362.5 (5 pp.).

Office Action, dated Oct. 1, 2012, in corresponding U.S. Appl. No. 12/982,350 (15 pp.).

European Office Action mailed Apr. 9, 2013 in corresponding European Patent Application No. 09802362.5-1853 (5 pages).

* cited by examiner ly period. 40
After obtaining the DCF and the license, the DRM agent
obtains the CEK through decryption, obtains the contents
through decryption, and uses the digital contents according to
the permissions specified in the license.
METHOD AND APPARATUS FOR SHARING LICENSES BETWEEN SECURE REMOVABLE MEDIA

CROSS-REFERENCE TO RELATED APPLICATIONS

This application is a continuation of U.S. application Ser. No. 12/982,350, filed on Dec. 30, 2010, which is a continuation of International Application No. PCT/CN2009/071721, filed on May 11, 2009, both of which are hereby incorporated by reference in their entireties. The International Application claims priority to Chinese Patent Application No. 200810134766.3, filed on Jul. 29, 2008, which is hereby incorporated by reference in its entirety.

FIELD OF THE INVENTION

The present invention relates to Digital Rights Management (DRM) technologies, and in particular, to a method and an apparatus for sharing licenses between Secure Removable Media (SRM).

BACKGROUND

In order to protect legal rights of the content owner, the DRM manages use of digital contents through a content protection and permissions control solution.

A typical DRM solution includes: A Content Issuer (CI) uses a Content Encryption Key (CEK) to encrypt digital contents and encapsulate them into a DRM Content Format (DCF), distributes them to the devices, and sends the content identifier of the digital contents and the corresponding CEK to the Rights Issuer (RI). The RI generates a license corresponding to the digital contents, and sends the license to a DRM agent in the device. The license includes the CEK, and the rights and limitations of using the contents. The rights include execution, playing, and moving; and the limitations include use count, accumulated time, and validity period. After obtaining the DCF and the license, the DRM agent obtains the CEK through decryption, obtains the contents through decryption, and uses the digital contents according to the permissions specified in the license.

The SRM is a kind of removable medium that protects internal data against unauthorized access. With the SRM storing and moving the DCF and the license, the storage space is expanded, and the license is movable.

In certain scenarios, the subscriber expects to present the license to others or replace the SRM, which involves moving or copying of the license from one SRM to another SRM. With the popularization of multi-card-in-one-phone, subscribers have more requirements of sharing licenses between SRM cards.

The SRM standard of the Open Mobile Alliance gives protocols for moving a license from a device to an SRM, and moving a license from an SRM to a device. The SRM agent is an entity for performing DRM-related functions in the SRM.

The prior art provides a solution to moving a license from a DRM agent to an SRM, and a solution to moving a license from an SRM to a DRM agent. In both of the solutions, the sharing permissions are deducted after every moving operation. If a license needs to be moved from SRM1 to SRM2, the license needs to be moved from SRM1 to the DRM agent first, and then from the DRM agent to SRM2, which involves at least two deductions of the sharing permissions. However, the prior art has the disadvantage that the moving of a license involves multiple deductions of permissions, which is a waste of permissions to the subscriber.

SUMMARY

The present invention provides a method and an apparatus for sharing a license between SRMs to overcome unnecessary consumption of sharing permissions.

The present invention is based on the following technical solution:

According to the first aspect of the present invention a method for sharing a license between SRMs includes:
  obtaining, by a DRM agent, the license from a first SRM, and setting the license to a forwarding state locally, wherein once the license is set to the forwarding state the license needs to be shared to another SRM and is not available to the DRM agent for consuming contents; deducting one permission of sharing the license; and sending the license to a second SRM.

According to another aspect of the present invention an apparatus for sharing a license includes:
  an obtaining unit, configured to obtain the license from a first SRM;
  a forwarding setting unit, configured to set the obtained license to a forwarding state, wherein once the license is set to the forwarding state the license needs to be shared to another SRM and is not available to the DRM agent for consuming contents;
  a sending unit, configured to send the obtained license to a second SRM; and
  a controlling unit, configured to deduct one permission of sharing the license.

In the prior art, one moving permission is deducted when the license moves from SRM1 to the device, and the other moving permission is deducted when the license moves from the device to SRM2. By contrast, in the present invention, the license forwarded by the DRM agent is set to the forwarding state, and only one moving permission needs to be deducted, and therefore, the consumption of the moving permissions is reduced and the subscriber's rights are protected.

In the present invention, the rights in SRM 1 are deleted only if SRM2 determines that it is capable of installing the rights. In the case that SRM2 is incapable of installing the rights, the DRM agent can recover the original rights on SRM1 easily by recovering the available state of the rights.

In the present invention, a Secure Authenticated Channel (SAC) is set between SRM1 and SRM2, the SAC moves the license, and a DRM agent is responsible only for forwarding the license. Because the forwarded rights are encrypted through the key negotiated between SRM1 and SRM2, the DRM agent is unable to execute operations for the rights. Therefore, the security of the rights is improved.

In the present invention, because an RI submits the rights to SRM2, it is not necessary to consume the moving permissions or the copying permissions. Therefore, the invention is also applicable to sharing of the license between SRMs of the same subscriber.

In the present invention, a license is shared between the SRMs that belong to the same subscriber. The DRM agent queries the RI about the subscriber to whom the SRM belongs. If the RI is unaware of the subscriber to whom the SRM belongs, the DRM agent may need to query another entity such as subscriber manage server about the subscriber to whom the SRM belongs. Alternatively, the DRM agent queries the entity that manages the relations between the SRM and the subscriber (such as subscriber manage server) directly about the subscriber to whom the SRM belongs. In this case, because the license is shared between the SRMs that belong to the same subscriber, no sharing permissions need to be deducted, and the subscriber's resources are saved.

DETAILED DESCRIPTION OF THE EMBODIMENTS

The embodiments of the present invention provide a solution to sharing a license between SRMs. Only one sharing permission is consumed when the license in SRM1 is shared with SRM2 through a DRM agent or RI.

The license sharing mentioned above includes moving and copying of the license. The following method embodiments primarily take the moving operation as an example.

The embodiments of the method for sharing a license between SRMs are elaborated below.

Overall, the method in the first embodiment and the method in the second embodiment include the following steps:

A DRM agent obtains the license from a first SRM, and sets the license to a forwarding state locally;

the DRM agent deducts one permission of sharing the license; and the DRM agent sends the license to a second SRM.

Sharing of a license refers to copying or moving of the license, and sharing of permissions refers to copying or moving of the permissions.

When sharing of a license refers to moving of the license, the following step needs to be performed additionally: The DRM agent triggers the first SRM to delete the license.

The first embodiment differs from the second embodiment in the time of performing the steps. In the first embodiment, the DRM agent triggers the first SRM to delete the license after the DRM agent sets the obtained license to a forwarding state; in the second embodiment, the DRM agent triggers the first SRM to delete the license after the DRM agent determines that the license is received by the second SRM.

First of all, the first embodiment is described below.

Figure 1:
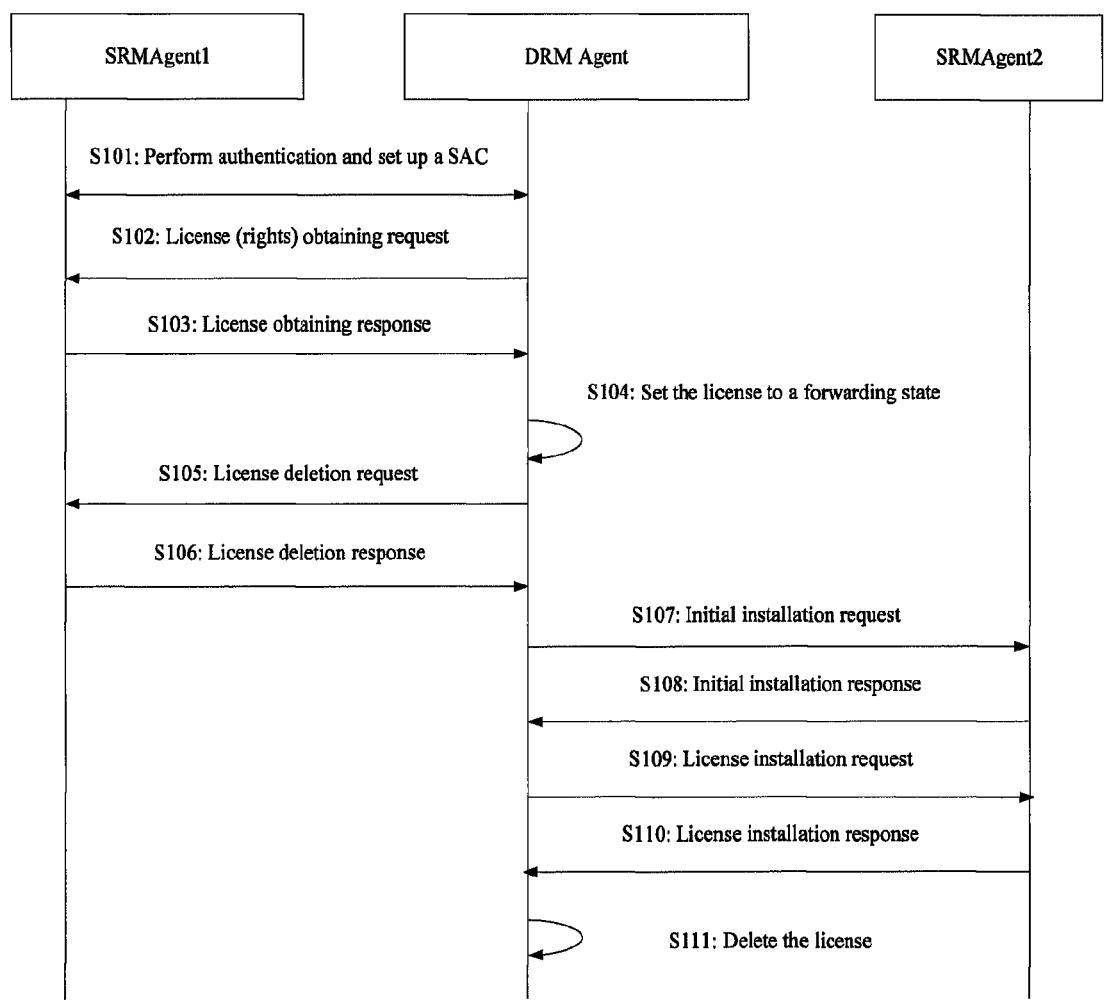
FIG. 1 is a flowchart of a method for sharing a license between SRMs according to the first embodiment of the present invention.

FIG. 1 is a flowchart of a method for sharing a license between SRM1 and SRM2 in the first embodiment of the present invention. The method includes the following steps:

S101: The DRM agent and SRM agent 1 authenticate each other, and a Secure Authenticated Channel (SAC) is set up between them. In the authentication process, the license is exchanged between DRM agent and SRM agent 1, and is checked for validity. A random number is exchanged between them, and a communication key is generated according to the random number. The communication keys include an encryption key and an integrity protection key.

The method of setting up a SAC between the DRM agent and the SRM agent is covered in the prior art, and is not detailed here any further.

S102-S103: The DRM agent initiates a process of moving the rights on SRM1 to SRM2 directly. This operation may be triggered by interaction between the subscriber and the DRM agent. The DRM agent obtains the rights information and the REK from SRM1, which is covered in the prior art.

S104: The DRM agent authenticates the rights information and the moving permissions, and deducts the moving permissions after the authentication succeeds, which is covered in the prior art. The deduction of the moving permissions may be: deducting one from the remaining moving permissions in the state information corresponding to the rights, or adding one to the consumed moving permissions in the state information corresponding to the rights. Once the rights are set to a forwarding state on the device, it means that the rights need to be moved to another SRM and are not available to the DRM agent for consuming contents. In this case, if the DRM agent knows that the rights will be moved to SRM2, the DRM agent may specify the SRM2 identifier.

S105-106: The DRM agent instructs SRM agent 1 to delete the rights, which is covered in the prior art.

S107-S108: The DRM agent checks whether SRM2 has enough space for installing the rights, which is covered in the prior art.

Before S107, the DRM agent and SRM agent 2 authenticate each other, and a SAC is set up between them. This step is S107a in FIG. 1. If the DRM agent can interact with two SRM agents simultaneously, S107a may occur at any time before S107.

If the DRM agent cannot interact with two SRM agents simultaneously, before S107, the DRM agent may be disconnected from SRM1 first, and then get connected with SRM2 to perform subsequent steps. The subscriber may operate the device to trigger the implementation of the subsequent steps. Specifically, the rights may be saved as a file of a special format in the device. The subscriber browses and determines that the rights are in the forwarding state, and chooses to move the file to another SRM to complete the forwarding. Alternatively, the device indicates the rights information to the subscriber, and the subscriber chooses whether to continue with the moving. Alternatively, the device performs the operation automatically according to the identifier of the destination device correlated with the rights. For example, when getting connected to SRM2, the device searches for local rights which are in the forwarding state and correlated with SRM2 as a destination device, and performs the steps after S107 automatically.

S109-S110: The DRM agent sends a rights installation request message to SRM agent 2. The rights installation request message carries a handle, a REK, a list of hash values of the content identifier, and rights information. SRM2 installs the rights and returns a response, without deducting the moving permissions for a second time. Therefore, the number of times of deducting the moving permissions is reduced.

S111: If SRM2 installs the rights successfully, the DRM agent deletes the local rights.

Optionally, the moving permissions are not deducted in S104, but are deducted on the device after the rights are installed onto SRM2.

Besides, after S106, the device may retain the record of the source SRM that forwards the rights, namely, record of SRM1. In this way, if the process of installing the rights onto SRM2 fails, for example, due to deficient space of SRM2, the rights can be recovered to SRM1, and the subscriber's rights are protected.

The first embodiment deals with the license sharing method by taking license moving as an example. As mentioned above, license sharing still includes license copying. The process of copying a license in SRM1 to SRM2 is similar to FIG. 1, but differs in that the copying permissions are consumed in the copying process: The DRM agent deducts one permission of copying the license on SRM1, and the license sent by the DRM agent to SRM2 does not include copying permission. Alternatively, the DRM agent deducts one permission of copying the license sent to SRM2, and deducts all permissions of copying the license on SRM1. SRM1 does not need to delete the license.

In the prior art, one sharing permission is deducted when the license moves from SRM1 to the device, and the other sharing permission is deducted when the license moves from the device to SRM2. By contrast, in this embodiment of the present invention, the rights forwarded by the DRM agent are set to the forwarding state, and only one moving permission needs to be deducted, and therefore, the consumption of the moving permissions is reduced and the subscriber's rights are protected.

Described below is a second embodiment of the method for sharing a license between SRMs.

In S107-S108 of FIG. 1 in the first embodiment, if the process of installing the rights onto SRM2 fails, the rights are recovered to SRM1, which is rather complicated. A simpler solution is to make sure that SRM2 has enough space for installing the rights and then delete the rights on SRM1.

Figure 2:
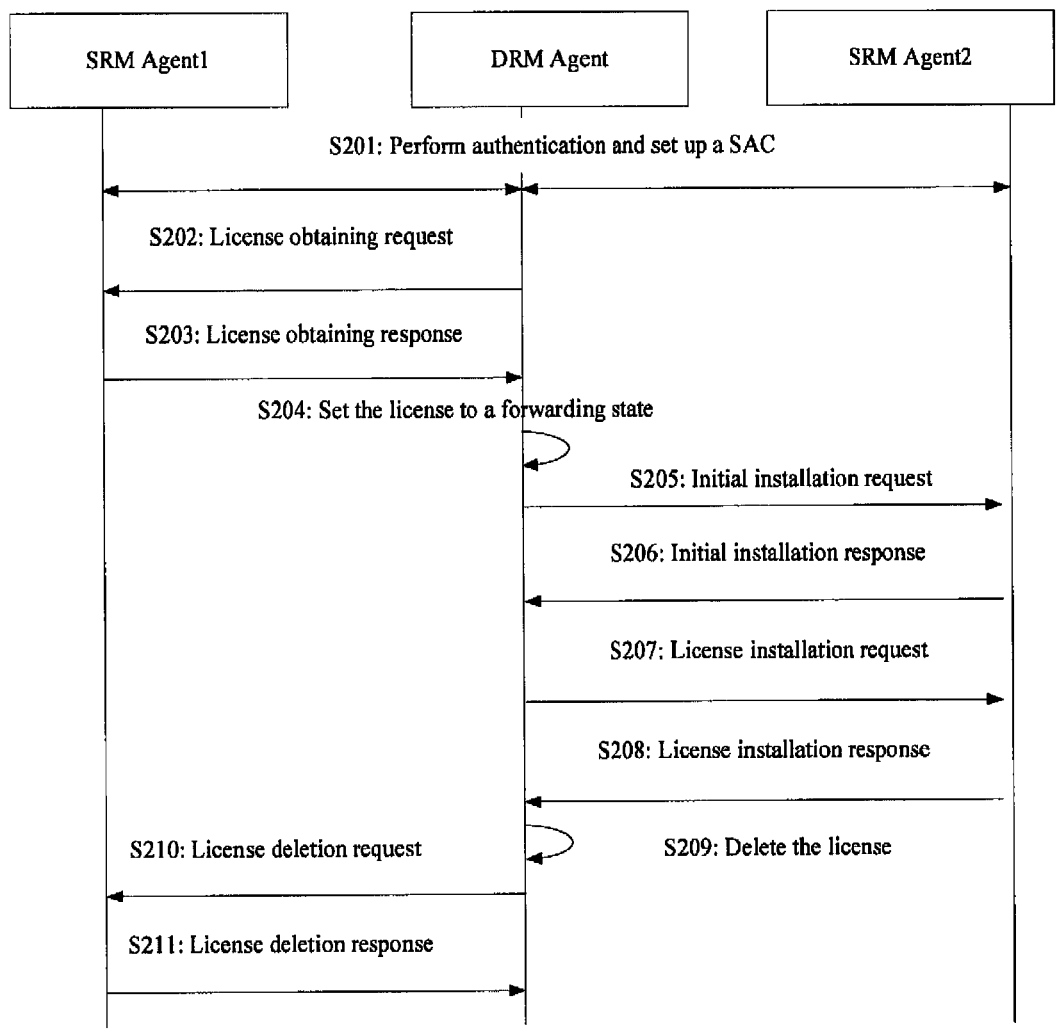
FIG. 2 is a flowchart of a method for sharing a license between SRMs according to the second embodiment of the present invention.

As shown in FIG. 2, the process of the second embodiment includes the following steps:

S201: The DRM agent, SRM agent 1, and SRM agent 2 authenticate each other, and a SAC is set up between them. The mutual authentication between the DRM agent and SRM agent 2 may occur at any time before S205.

S202-S203: The DRM agent initiates a process of moving the rights on SRM1 to SRM2 directly. This operation may be triggered by interaction between the subscriber and the DRM agent. The DRM agent obtains the rights information and the REK from SRM1.

S204: The DRM agent authenticates the rights information and the moving permissions, and deducts the moving permissions after the authentication succeeds. The operation of deducting the moving permissions may be performed after S206.

S205-S206: The DRM agent checks whether SRM2 has enough space for installing the rights.

S207-S208: The DRM agent sends a rights installation request message to SRM agent 2. The rights installation request message carries a handle, a REK, a list of hash values of the content identifier, and rights information. SRM2 installs the rights and returns a response. If SRM2 installs the rights successfully, the DRM agent deletes the local rights.

S209-S210: If SRM2 installs the rights successfully, the DRM agent instructs SRM agent 1 to delete the rights.

S209-S210 may occur after S206.

If the process of installing the rights onto SRM2 fails, for example, due to deficient space of SRM2, the DRM agent may cancel the moving operation, and recover the original rights on SRM1. If the DRM agent is disconnected from an SRM, the DRM agent may keep a disconnection log. The disconnection log includes: operation type, current state, license identifier, SRM1 identifier, handle 1 on SRM1 corresponding to the license, SRM2 identifier, and handle 2 on SRM2 corresponding to the license on SRM2. At the next attempt of connection, the license is recovered according to the information in the disconnection log: The DRM agent continues sending the license to SRM2 to complete the operation; or cancels the operation and recovers the license to SRM1.

In order to improve the security of the REK to some extent, the DRM agent may submit the public key or license of SRM2 to SRM agent 1. SRM agent 1 uses the public key of SRM2 to encrypt the REK, and transmits the REK to SRM2 through the DRM agent.

Evidently, the second embodiment differs from the first embodiment in that: The rights in SRM1 are deleted only if SRM2 determines that it is capable of installing the rights. In the case that SRM2 is incapable of installing the rights, the DRM agent can recover the original rights on SRM1 easily by recovering the available state of the rights.

Described below is a third embodiment of the method for sharing a license between SRMs.

In the third embodiment, with assistance of the DRM agent, a SAC is set up between SRM1 and SRM2, and the license is shared through a SAC key. The third embodiment still takes license moving as an example, and the scenario of copying a license is similar.

Overall, the third embodiment includes the following steps:

A DRM agent triggers a first SRM and a second SRM to negotiate a shared key;

the first SRM encrypts partial or complete information of the license by using the shared key; and the first SRM sends the license to the second SRM.

The third embodiment is elaborated below with reference to FIG. 3.

Figure 3:
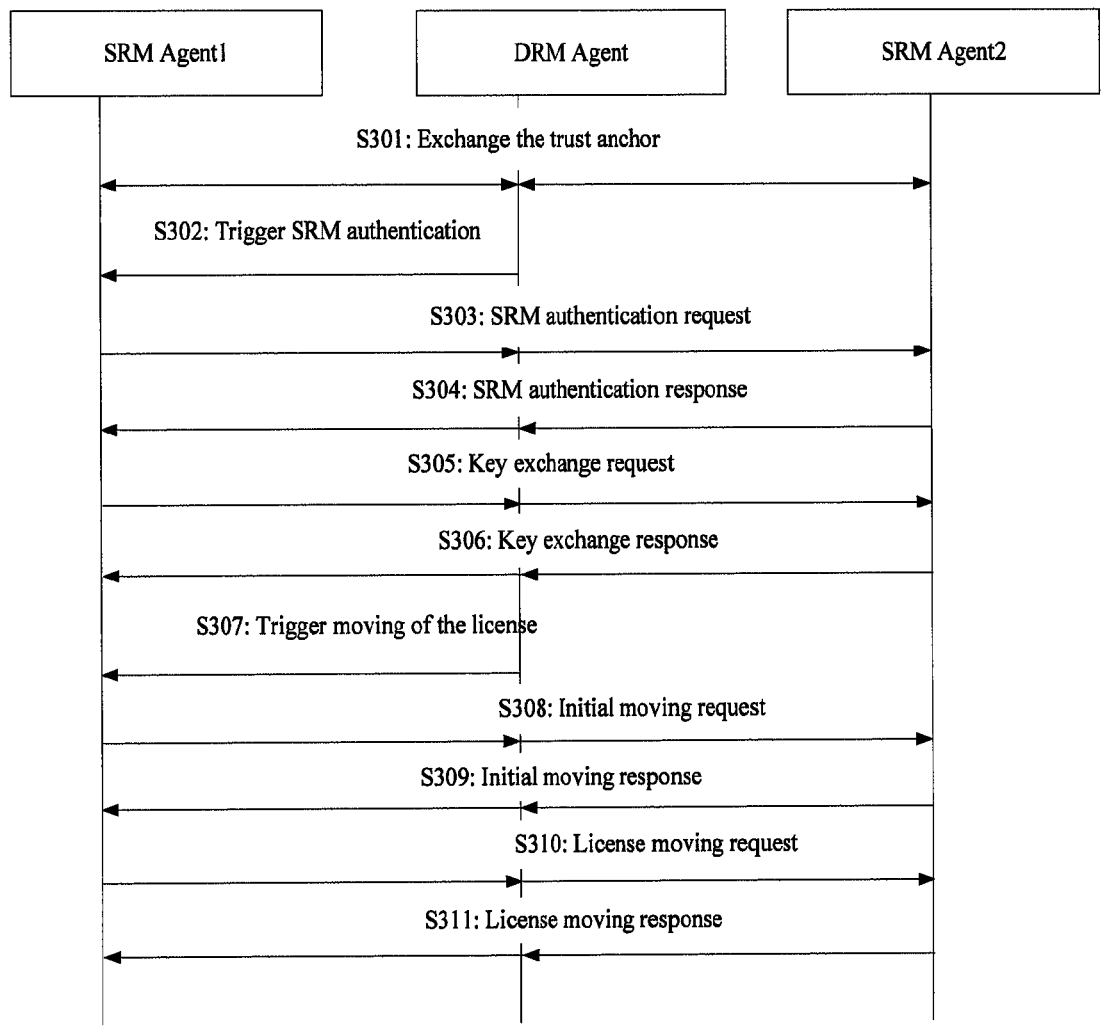
FIG. 3 is a flowchart of a method for sharing a license between SRMs according to the third embodiment of the present invention.

As shown in FIG. 3, the process of the third embodiment includes the following steps: S301: The DRM agent, SRM agent 1, and SRM agent 2 exchange the supported trust anchor with each other.

S302: The DRM agent triggers authentication of SRM agent 1 and SRM agent 2. The authentication trigger message carries the selected trust anchor. The DRM agent may select the trust anchor according to the rights to be moved. Optionally, the authentication trigger message may further carry an SRM2 identifier. To trigger this step, the subscriber may choose to move the rights between the two SRMs.

S303: SRM agent 1 sends an authentication request to SRM agent 2. The authentication request carries a trust anchor, an SRM1 certificate chain, and the algorithm supported by SRM agent 1. If direct communication is enabled between SRM agent 1 and SRM agent 2, the message does not need to pass through the DRM agent; otherwise, all messages need to be forwarded by the DRM agent.

S304: SRM agent 2 returns an authentication response to SRM agent 1. The authentication response carries an SRM agent 2 certificate chain, the algorithm selected by SRM2, and random number 1 (RN 1) for generating a key. RN 1 needs to be transmitted after being encrypted through a public key of SRM2.

S305: SRM agent 1 sends a key exchange request to SRM agent 2. The key exchange request carries random number 2 (RN2) for generating a key. RN2 needs to be transmitted after being encrypted through a public key of SRM1.

S306: SRM agent 2 returns a key exchange response to SRM agent 1. The key exchange response may carry the hash value of the connection value of RN1 and RN2 for confirming the random number. By now, SRM1 and SRM2 have obtained RN1 and RN2, and use RN1 and RN2 respectively to generate a session key and a Media Access Control (MAC) key.

S307: The DRM agent triggers SRM agent 1 to move rights to SRM2. The moving trigger message may carry a handle or a license identifier on the SRM1, wherein the handle or license identifier on the SRM1 corresponds to the right.

S308: SRM agent 1 sends an initial moving request to SRM agent 2. The initial moving request carries size of the rights, and optionally, carries a handle on the SRM2 corresponding to the rights.

S309: SRM agent 2 checks whether enough space is available for installing the rights locally. If a handle is sent by SRM agent 1 in S508, SRM agent 2 needs to check whether the handle sent by SRM agent 1 is a duplicate of the handle on SRM2, and add the check result into an initial moving response returned to SRM agent 1. If no handle is sent by SRM agent 1 in S308, SRM agent 2 may generate a handle automatically which is different from other handles existent locally, and may return the generated handle through the initial moving response.

S310: SRM agent 1 sends a moving request to SRM agent 2. The moving request carries rights information, a REK, and a content identifier correlated to the rights. If SRM agent 1 knows the handle correlated with the rights on SRM2, this handle may be carried in the moving request.

S311: SRM agent 2 authenticates the rights information, deducts the moving permissions after the authentication succeeds, and stores the rights into SRM2.

Optionally, SRM agent 1 may check and deduct the moving permissions before S310. In this case, SRM agent 2 does not need to deduct the moving permissions in step S311.

The third embodiment differs from the first embodiment and the second embodiment in that: A SAC is set between SRM1 and SRM2; the license is moved through the SAC; and a DRM agent is responsible only for forwarding the license. Because the forwarded rights are encrypted through the key negotiated between SRM1 and SRM2, the DRM agent is unable to execute operations for the rights. Therefore, the security of the rights is improved.

However, if SRM1 and SRM2 are incapable of authenticating the rights, the DRM agent may authenticate the rights instead and deduct the moving permissions. This operation may be performed in S310, and the prerequisite is that SRM agent 1 or SRM agent 2 notifies the MAC key to the DRM agent.

S301-S306 in FIG. 3 is a process of negotiating the shared key between two SRMs. This process is put forward in an embodiment of the present invention, and is outlined below:

The DRM agent initiates an authentication process to the SRM 1 and obtains the first SRM certificate chain;

the DRM agent initiates an authentication process to the SRM 2, sends the obtained first SRM certificate chain to the second SRM, and obtains the second SRM certificate chain and a second random number from the SRM 2, where the second random number is encrypted through the first SRM public key;

the DRM agent initiates a key exchange process to the SRM 1, sends the second SRM certificate chain and the second random number encrypted through the first SRM public key to the SRM 1, and obtains the first random number encrypted through the second SRM public key from the SRM 1;

the DRM agent initiates a key exchange process to the SRM 2, and sends the first random number encrypted through the second SRM public key to the SRM 2; and the SRM 1 and the SRM 2 use the first random number and the second random number to determine a shared key.

Figure 4:
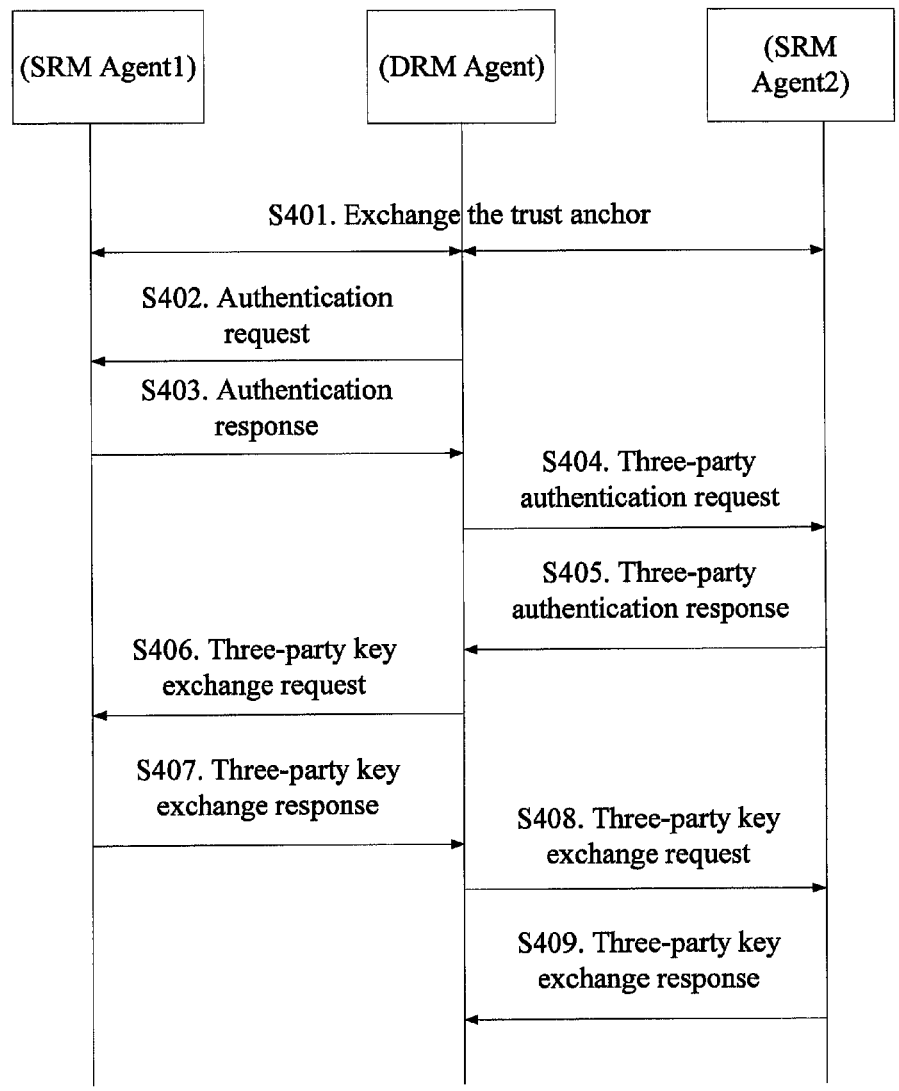
FIG. 4 is a flowchart of negotiating a shared key between SRMs shown in FIG. 3 according to an embodiment of the present invention.

This process may occur together with the process of negotiating the shared key between the DRM agent and the two SRMs. As shown in FIG. 4, this process includes:

S401: The DRM agent, SRM agent 1, and SRM agent 2 exchange the supported trust anchor with each other.

S402: The DRM agent sends an authentication request to SRM agent 1. The authentication request carries the selected trust anchor and a device certificate chain corresponding to this trust anchor. The DRM agent may select the trust anchor according to the rights to be moved.

S403: SRM agent 1 returns an authentication response. The response message carries an SRM1 certificate chain, and a random number (RNs1d) encrypted through a device public key.

S404: The DRM agent sends a three-party authentication request to SRM agent 2. The three-party authentication request carries the selected trust anchor, a device certificate chain corresponding to this trust anchor, and an SRM1 certificate chain.

S405: SRM agent 2 returns a three-party authentication response. The three-party authentication response carries an SRM2 certificate chain, a random number (RNs2d) encrypted through a device public key, and a random number (RNs2s1) encrypted through an SRM1 public key.

S406: The DRM agent sends a three-party key exchange request to SRM agent 1. The three-party key exchange request carries an SRM2 certificate chain, a random number (RNs2s1) encrypted through an SRM1 public key, and a random number (RNds1) encrypted through an SRM1 public key (the random number may be encrypted through the SRM1 public key after being connected with hash of RNs1d).

S407: SRM agent 1 returns a three-party key exchange response. The three-party key exchange response carries a random number (RN s1s2) encrypted through an SRM2 public key (the random number may be encrypted through the SRM2 public key after being connected with hash of RNs2s1), and optionally carries the hash of the connection value of RNds1 and RNs1d.

S408: The DRM agent sends another three-party key exchange request to SRM agent 2. The another three-party key exchange request carries a random number (RNs1s2) encrypted through an SRM2 public key (the random number may be encrypted through the SRM2 public key after being connected with hash of RNs2s1), and a random number (RNds2) encrypted through the SRM2 public key (the random number may be encrypted through the SRM2 public key after being connected with hash of RNs2d).

S409: SRM agent 2 returns another three-party key exchange response. The another three-party key exchange response may carry hash of the connection value of RN s1s2 and RNs2s1 and hash of the connection value of RNds2 and RNs2d.

By now, a pair of random numbers has been shared between the DRM agent, SRM agent 1, and SRM agent 2, which can generate a key independently by using the shared random number. In this way, when SRM1 moves rights to SRM2, important information such as REK can be encrypted through the key shared with SRM2, and other information can be encrypted through the key shared with the DRM agent, or its integrity can be protected to facilitate DRM agent processing.

The random number submitted by the DRM agent to SRM agent 1 may be the same as the random number submitted by the DRM agent to SRM agent 2. In this way, the three parties can use the shared random number to generate a three-party shared key.

Alternatively, the DRM agent may use RNs 1 d provided by SRM agent 1 as RNds2, and submit it to SRM agent 2; and use RNs2d provided by SRM agent 2 as RNds1, and submit it to SRM agent 1. In this way, a key shared by the three parties can also be generated.

Currently, when the SRM agent and the DRM agent use the random number to generate a key, they are connected according to the order of RNd and RNs. However, in this solution, in order to ensure consistency of the key, they may be connected according to the transmission order for each pair of random numbers. That is, SRM agent 1 gets connected according to the order of RNs1d and RNds1, and SRM agent 2 gets connected according to the order of RNds2 and RNs2d. On the condition that the consistency of the key is not affected, the key may be generated in other modes.

In the process of moving rights from SRM1 to SRM2 through the DRM agent, to be on the safe side, SRM1 confirms that SRM2 has received the rights before deleting the rights on SRM1. Specifically, the confirmation information of SRM2 may be an installation information signature affixed with a private key (such as REK), or a result of encrypting the installation information by using a key shared by only SRM1 and SRM2 (REK); or SRM1 submits confirmation information (such as random number) to SRM2, and this confirmation information may be transmitted after being encrypted through the public key of SRM2 or the key shared by SRM1 and SRM2. SRM2 indicates to SRM1 that the confirmation information is received. For example, SRM2 uses a private key to convert the signature or confirmation information in a certain way (such as hash operation or a simple operation of adding 1), and then uses a key shared by SRM1 and SRM2 to encrypt the converted result and returns it.

Described below is a fourth embodiment of the method for sharing a license between SRMs.

In the foregoing solution, the rights are moved between two SRMs through the DRM agent. In some circumstances, the two SRMs may be located in different places, and cannot be connected to the same DRM agent directly, and the rights need to be forwarded by more than one DRM agent. For example, DRM agent 1 obtains the rights from SRM1, moves the rights to DRM agent 2, and indicates to the DRM agent 2 that the rights are directed to SRM2. DRM agent 2 moves the rights to SRM2.

Besides, the rights may be moved between two SRMs through an RI, as outlined below:
The DRM agent 1 obtains a license from the SRM 1 and sends the license to the RI; and
the DRM agent 2 obtains the license from the RI, and sends the license to the SRM 2.

Figure 5:
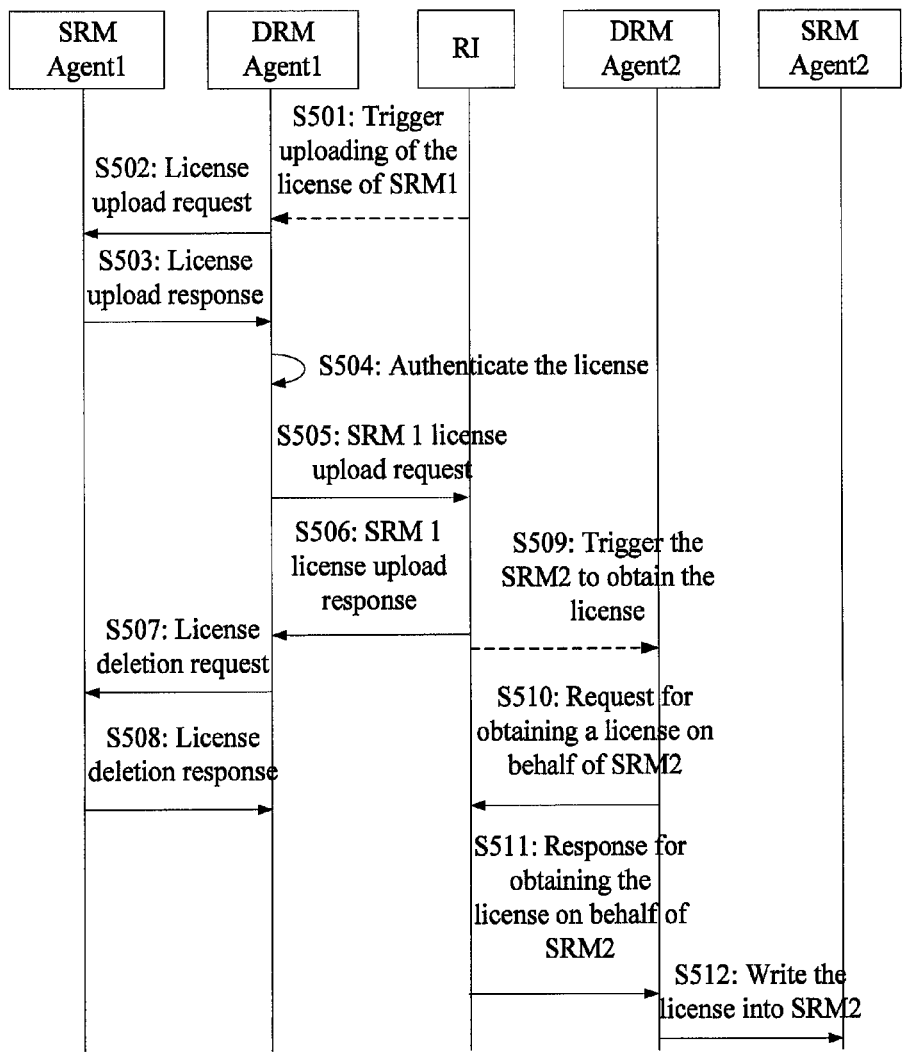
FIG. 5 is a flowchart of a method for sharing a license between SRMs according to the fourth embodiment of the present invention.

As shown in FIG. 5, the process includes the following detailed steps:

S501: The RI sends a ROAP trigger {SRMROUpload} to DRM agent 1, triggering the device to upload the license on the SRM. The ROAP trigger includes information such as RI identifier and RI URL, and includes a roRequested property of the Boolean typeindicating whether the RI requires the SRM to report the rights to be uploaded. If the RI has buffered the delivered license, the value of the roRequested property is "false"; otherwise, the value of the roRequested property is "true". Optionally, the trigger includes an SRM1 identifier and a license identifier. This step is optional. The subscriber may use a man-machine interface to operate the device to upload the license on SRM1, and the process starts from S502 directly.

S502: DRM agent 1 sends a RightsUpload request message to SRM agent 1. The RightsUpload request message carries a handle that identifies the rights, and a new handle for replacing handle that identifies the rights Before S502, DRM agent 1 and SRM agent 1 need to authenticate each other, and a SAC is set up between them.

S503: SRM agent 1 judges whether the new handle is a duplicate of other local handles. If the new handle is not a duplicate, SRM agent 1 replaces the handle that identifies the rights with the new handle, and sets the rights to the unavailable state. SRM agent 1 returns a RightsUpload response message to DRM agent 1. If the new handle is not a duplicate, the RightsUpload response message further carries the rights information, REK, Kmac, timestamp, and signature affixed by SRM agent 1 for {flag indicative of upload, REK, RI identifier, timestamp}.

S504: DRM agent 1 checks whether the RI signature in the rights information and the state information exceed the original rights.

S505: DRM agent 1 sends a SRMROUpload request message to the RI. The SRMROUpload request message not only carries public parameters such as identifier of device 1, RI identifier, nonce, timestamp, and certificate chain of device 1, but also carries upload information:
RightsObjectContainer part in the rights information obtained from SRM agent 1 (namely, <rights> and <signature> in the license delivered by the original RI) or a result of converting its format. If the RI marks roRequested as "false" in ROAP trigger {SRMROUpload}, this parameter is omissible;
state information in the rights information obtained from SRM agent 1 if the license has a state;
REK and Kmac encrypted through an RI public key;
an SRM1 identifier, SRM1 certificate chain, timestamp in the SRMRightsUpload response message, signature affixed by SRM agent 1 for {flag indicative of upload, REK, RI identifier, timestamp}; and
a result of performing MAC operation for the foregoing parameters by using Kmac.

DRM agent 1 needs to affix a signature to the parameters in the request message, and sends the request message that carries the signature to the RI.

S506: The RI verifies the parameters in the request message:
If the request message carries a DRM agent 1 certificate chain, the RI verifies the validity of the certificate chain (which may be implemented through OCSP or CRL), and uses the DRM agent 1 certificate chain in the request message or the DRM agent 1 certificate chain in the local device context of the RI to verify the DRM agent 1 signature in the request message.

The RI obtains REK and Kmac through decryption, and applies the MAC value in the Kmac verification request message.

The RI verifies validity of the SRM1 certificate chain, possibly through OCSP or CRL, and uses the SRM1 certificate chain to verify the validity of the SRM1 signature information.

The RI verifies whether the timestamp in the request message is earlier than the current time, and whether the timestamp in the SRMRightsUpload response message is earlier than the timestamp in the request message.

The RI verifies correctness of <rights> and <signature> (if they exist in the request message), and, if the license has a state, the RI verifies whether the state information falls within the original license.

The RI attempts to use the REK to decrypt the CEK in the <rights> element, and verifies correctness of the REK and the rights.

S507: DRM agent 1 sends a RightsRemovalRequest message to SRM agent 1. The message carries a handle that identifies the rights. This handle is the new handle in S502.

S508: SRM agent 1 deletes the rights corresponding to the handle in the RightsRemovalRequest message, and returns a RightsRemovalResponse message that carries the processing result to DRM agent 1.

S509: The RI sends another ROAP trigger {SRMROAcquisition} to DRM agent 2, triggering DRM agent 2 to help SRM2 obtain the uploaded license. The another ROAP trigger includes these parameters: RI identifier, RI alias, RI URL, license identifier, license alias, content identifier, and an indication of whether the RI stores the certificate chain of device 2 and SRM2. DRM agent 2 and DRM agent 1 may be the same DRM agent. This step is optional. The subscriber may use a man-machine interface to operate the device to obtain the license in place of SRM2, and the process starts from S510 directly.

S510: DRM agent 2 sends a request for obtaining the license to the RI. The request carries: device 2 identifier, RI identifier, nonce, timestamp, license identifier, SRM2 identifier, certificate chain of device 2, and certificate chain of SRM2. If the trigger indicates that the RI already stores the certificate chain of device 2 or SRM2, the certificate chain does not need to be carried in this request. Before S510, DRM agent 2 and SRM agent 2 need to authenticate each other, and a SAC is set up between them.

S511: The RI returns a license response to DRM agent 2. The response carries: device 2 identifier, RI identifier, nonce, protected license, and RI certificate chain (if the request from DRM agent 2 indicates that DRM agent 2 has stored the RI certificate chain, the RI certificate chain does not need to be carried in this license response). The license may be bound to SRM2, or bound to DRM agent 2, but it is indicated that the licensed need be provided to SRM2.

S512: DRM agent 2 writes the license delivered by the RI into SRM2. If the license is bound to SRM2, DRM agent 2 may send the encrypted connection value of REK and Kmac to SRM agent 2 first, SRM agent 2 sends the connection value to Kmac, and uses the connection value to verify integrity of the license. DRM agent 2 writes the rights and the signature into SRM2. If the license is bound to DRM agent 2, DRM agent 2 obtains the REK through decryption, and writes the REK together with the rights and the signature into SRM2.

In the foregoing process, S507-S508 may occur before, during, or after S509-S512.

In the foregoing embodiments of the method for sharing a license between SRMs, the first embodiment to the third embodiment involve consumption of only one moving permission or copying permission; in the fourth embodiment, because the RI provides the license for SRM2, no moving permission or copying permission needs to be consumed. Therefore, the fourth embodiment is also applicable to the scenario of sharing a license between SRMs of the same subscriber. If the sharing permissions need to be consumed for sharing of the license between SRMs of the same subscriber, the subscriber incurs losses. Therefore, a solution to sharing a license between SRMs of the same subscriber without consuming sharing permissions is provided in an embodiment of the present invention.

Although no moving permission is consumed for sharing of a license between the SRMs of the same user, the RI needs to verify that SRM2 and SRM1 belong to a same subscriber. Multiple verification methods are applicable: The RI performs the verification according to the mapping relation between the locally stored SRM identifier and the subscriber identifier, or the RI queries another entity such as subscriber manager, or the RI performs the verification according to the information provided by the subscriber when the subscriber attempts to use the SRM (for example, password, and an answers to a question).

The subscriber may upload multiple licenses to the RI at a single attempt, or install multiple licenses onto SRM2 at a single attempt. This batch processing mode is especially applicable to the scenario that the subscriber replaces the SRM card.

The following solution serves as a substitute of the solution to sharing rights between SRMs of the same subscriber: The DRM agent queries the RI about whether SRM1 and SRM2 belong to the same subscriber, and the rights are shared directly, without requiring the RI to re-generate the license.

Overall, the method for sharing a license between SRMs of the same subscribers in an embodiment of the present invention includes:

The DRM agent sends the license obtained from a first SRM to a second SRM after determining that the first SRM and the second SRM belong to the same subscriber.

The fifth embodiment differs from the sixth embodiment in how the DRM agent queries the RI or the subscriber manager about whether the first SRM and the second SRM belong to the same subscriber.

Detailed below are embodiments of the method for sharing a license between SRMs of the same subscriber.

First, the fifth embodiment of the method for sharing a license between SRMs of the same subscriber is described below.

Overall, the process of querying whether the first SRM and the second SRM belong to the same subscriber in the fifth embodiment is:

By sending a query message that carries the identifier of the SRM 1 to the RI or subscriber manage server, the DRM agent queries the subscriber to whom the SRM 1 belongs;

by sending another query message that carries the identifier of the SRM 2 to the RI or subscriber manage server, the DRM agent queries the subscriber to whom the SRM 2 belongs; and the DRM agent checks whether the SRM 1 and the SRM 2 belong to the same subscriber.

Figure 6:
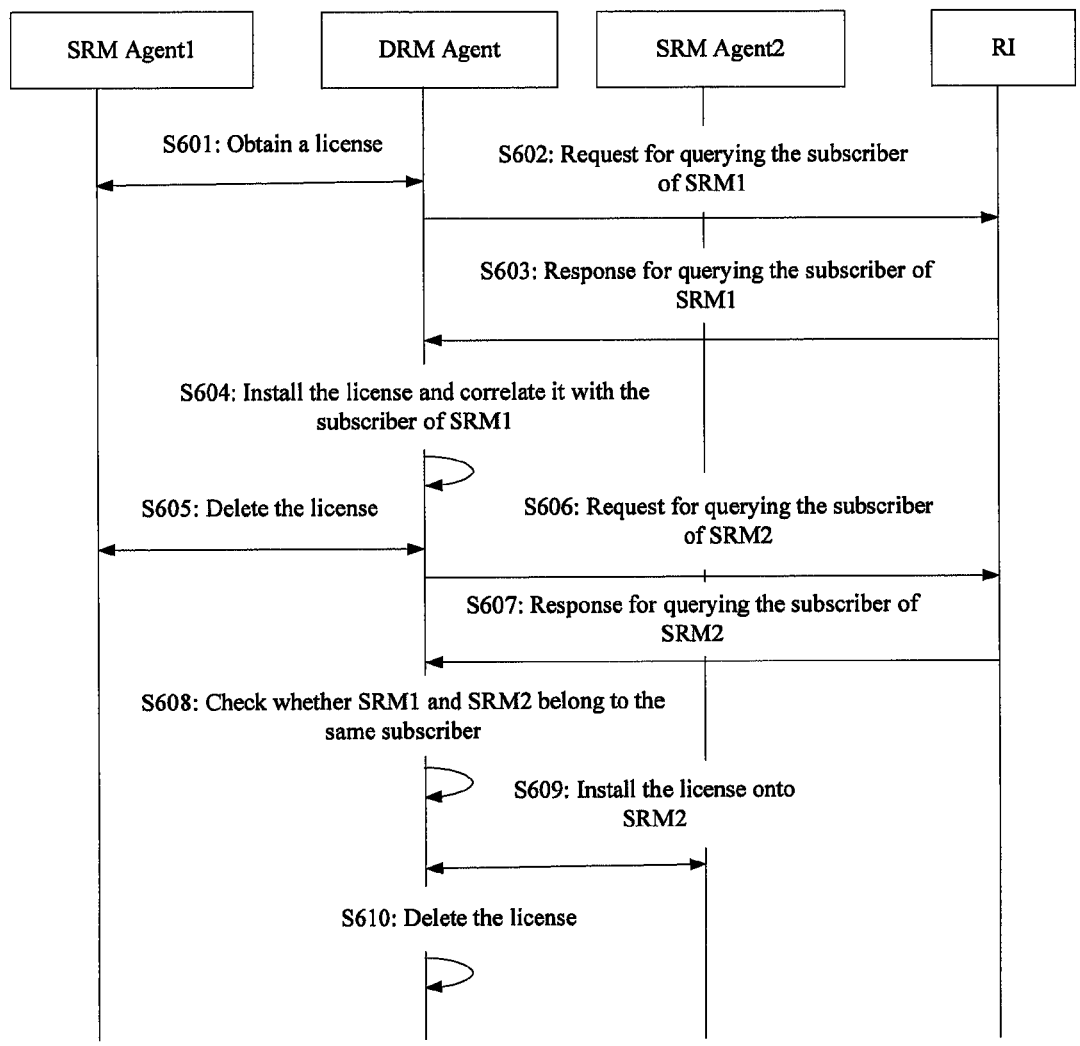
FIG. 6 is a flowchart of a method for sharing a license between SRMs of the same subscriber according to the fifth embodiment of the present invention.

As shown in FIG. 6, the process of the fifth embodiment includes the following steps:

S601: The DRM agent shares the rights on SRM1 with SRM 2 of the same subscriber according to a subscriber request, and obtains rights information and a REK from SRM1. Before S601, the DRM agent and SRM agent 1 need to authenticate each other, and a SAC is set up between the DRM agent and SRM agent 1.

S602-S603: The DRM agent queries the RI about the subscriber to whom SRM1 belongs. The query request carries an SRM1 identifier, and the RI returns a response message that carries the subscriber identifier.

S604: The DRM agent checks whether the RI signature in the rights information and the state information exceed the original rights in the rights information, and installs the rights if they do not exceed the original rights. When installing the rights, the DRM agent identifies the unavailable state of the rights, and correlates the rights with the subscriber identifier returned by the RI in S603.

S605: If the sharing operation is a moving operation, the DRM agent instructs SRM1 to delete the rights, as detailed in S105-S106 in FIG. 1.

S606-S607: DRM agent shares the rights with SRM2. Because the rights are bound to the subscriber identifier, the DRM agent queries the RI about the subscriber to whom SRM2 belongs. The query request carries an SRM2 identifier, and the RI returns a response message that carries the subscriber identifier. Before S606, the DRM agent and SRM agent 2 need to authenticate each other, and a SAC is set up between them.

S608: The DRM agent checks whether the subscriber of SRM2 is the same as the subscriber bound to the rights, namely, the same as the subscriber of SRM1. If the subscriber is the same, the DRM agent performs S609, or else rejects to share the rights with SRM2.

S609: The DRM agent installs the rights onto SRM2, as detailed in S107-S110 in FIG. 1.

S610: If SRM2 installs the rights successfully, the DRM agent deletes the local rights.

Now, the sixth embodiment of the method for sharing a license between SRMs of the same subscriber is described below.

In the fifth embodiment, the DRM agent queries the subscriber of SRM1 and the subscriber of SRM2 respectively and compares the two subscribers; in the sixth embodiment, however, the DRM agent reports the identifier of SRM1 and the identifier of SRM2 to the RI, and the RI compares the two subscribers and returns a comparison result. In this case, the DRM agent does not need to understand details of the subscriber identifier.

Overall, the process of querying the subscriber of the first SRM and the subscriber of the second SRM in the sixth embodiment is:

By sending a query message that carries the identifier of the SRM 1 and the identifier of the SRM 2 to the RI or subscriber manager, the DRM agent checks whether the first SRM and the second SRM belong to the same subscriber; and the RI or subscriber manager returns a query response to the DRM agent, indicating whether the first SRM and the second SRM belong to the same subscriber.

Figure 7:
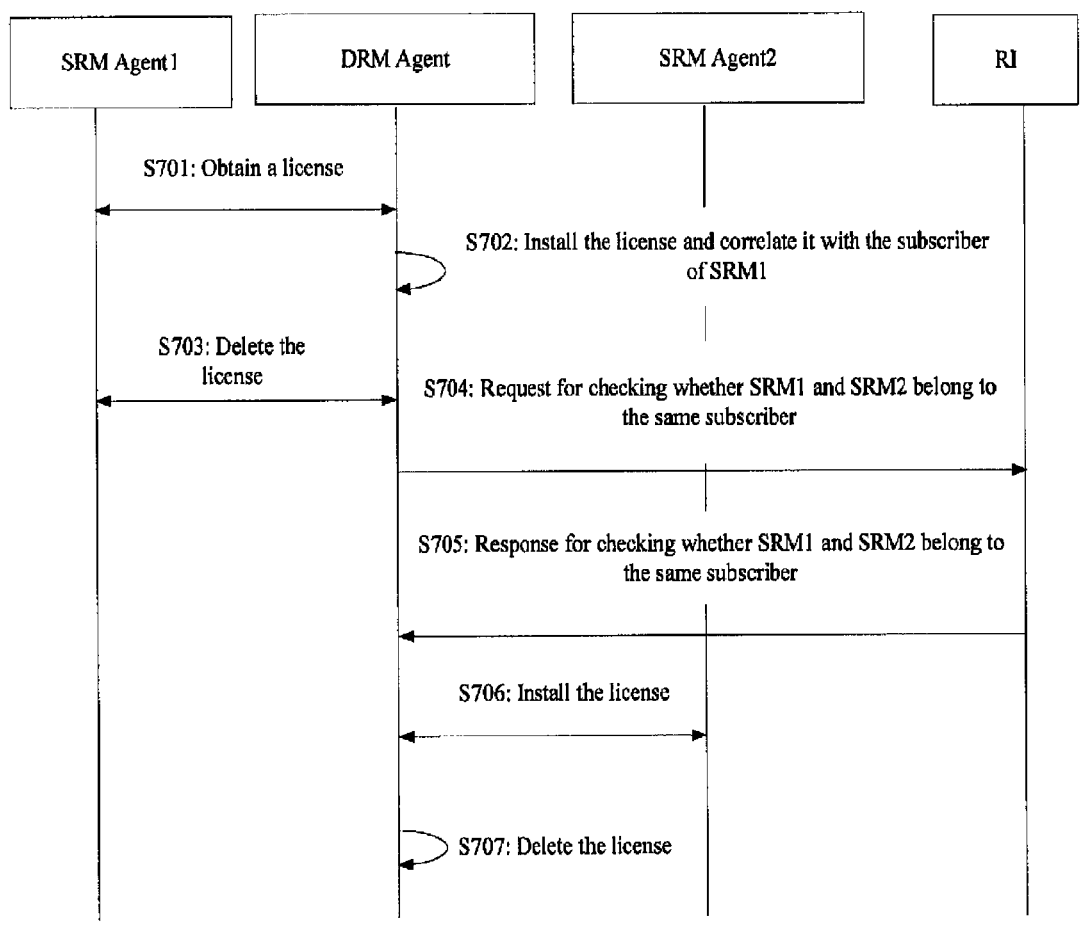
FIG. 7 is a flowchart of a method for sharing a license between SRMs of the same subscriber according to the sixth embodiment of the present invention.

As shown in FIG. 7, the process of the sixth embodiment includes the following steps:

S701: The DRM agent shares the rights on SRM1 with another SRM of the same subscriber according to a subscriber request, and obtains rights information and a REK from SRM1, as detailed in S102-S103 in FIG. 1. Before S701, the DRM agent and SRM agent 1 need to authenticate each other, and a SAC is set up between the DRM agent and SRM agent 1.

S702: The DRM agent checks whether the RI signature in the rights information and the state information exceed the original rights in the rights information, and installs the rights if they do not exceed the original rights. When installing the rights, the DRM agent identifies the unavailable state of the rights, and correlates the rights with the subscriber of SRM1.

S703: If the sharing operation is a moving operation, the DRM agent instructs SRM1 to delete the rights, as detailed in S105-S106 in FIG. 1.

S704-S705: DRM agent shares the rights with SRM2. Because the rights are bound to the subscriber of SRM1, the DRM agent queries the RI about whether SRM1 and SRM2 belong to the same subscriber. The query request carries the identifier of SRM1 and the identifier of SRM2. The RI checks whether the subscriber correlated with SRM1 is the same as the subscriber correlated with SRM2, and returns a check result through a response message. If the result shows that SRM1 and SRM2 belong to the same subscriber, the DRM agent performs S706; otherwise, the DRM agent rejects to share the rights with SRM2. Before S904, the DRM agent and SRM agent 2 need to authenticate each other, and a SAC is set up between them.

S706: The DRM agent installs the rights onto SRM2, as detailed in S107-S110 in FIG. 1.

S707: If SRM2 installs the rights successfully, the DRM agent deletes the local rights.

In the sixth embodiment, the DRM agent obtains the license from SRM1 first, and then queries the RI about whether SRM1 and SRM2 belong to the same subscriber. If the destination SRM is already determined when the subscriber initiates the sharing, optionally, the DRM agent queries the RI about whether SRM1 and SRM2 belong to the same subscriber first, and then obtains the license from SRM1. Besides, the DRM agent may check whether SRM2 has enough space for installing the rights and then deletes the rights on SRM1.

In the foregoing two embodiments of the method for sharing a license between the SRMs that belong to the same subscriber, the DRM agent queries the RI about the subscriber to whom the SRM belongs. If the RI is unaware of the subscriber to whom the SRM belongs, the DRM agent may need to query another entity such as subscriber manage server about the subscriber to whom the SRM belongs. Alternatively, the DRM agent queries the entity that manages the relations between the SRM and the subscriber (such as subscriber manager) directly about the subscriber to whom the SRM belongs.

In the foregoing two embodiments of the method for sharing a license between the SRMs that belong to the same subscriber, it is assumed that SRM1 and SRM2 are connected with the same DRM agent. In some circumstances, the two SRMs are located in different places and cannot be connected to the same DRM agent, and the rights need to be forwarded by more than one DRM agent. For example, FIG. 6 is modified in that two DRM agents exist: DRM agent 1 connected to SRM1 and DRM agent 2 connected to SRM2. Specifically, DRM agent 1 queries the subscriber of SRM1, and, when moving the license to DRM agent 2, specifies that the rights can be shared only with the SRM of this subscriber. DRM agent 2 determines that SRM2 belongs to the same subscriber before installing the rights onto SRM2. Alternatively, after determining that SRM1 and SRM2 belong to the same subscriber, DRM agent 1 shares the license with DRM agent 2 and specifies that the license is finally shared with SRM2, and then DRM agent 2 installs the rights onto SRM2. Alternatively, the DRM agent shares the license with DRM agent 2 and specifies that the license is shared with the SRM that belongs to the same subscriber of SRM1. After determining that SRM1 and SRM2 belong to the same subscriber, the DRM agent installs the rights onto SRM2. FIG. 7 is modified in the following way: DRM agent 1 queries the RI about the subscriber of SRM1 and the subscriber of SRM2; after the RI determines that SRM1 and SRM2 belong to the same subscriber, DRM agent 1 shares the license with DRM agent 2, and DRM agent 2 installs the rights onto SRM2. Alternatively, DRM agent 1 shares the license with DRM agent 2, and DRM agent 2 queries the RI about the subscriber of SRM1 and the subscriber of SRM2; after the RI determines that SRM1 and SRM2 belong to the same subscriber, DRM agent 2 installs the rights onto SRM2. Evidently, in the fifth embodiment and the sixth embodiment, the license is shared between two SRMs of the same subscriber without consuming the sharing permissions, the subscriber's rights are protected.

In conclusion, when the subscriber initiates sharing of a license between two SRMs, the device may judge whether the two SRMs belong to the same subscriber: if they belong to the same subscriber, the license is shared directly without checking the sharing permissions, as illustrated in the fifth embodiment and the sixth embodiment; if they belong to different subscribers, the device checks the sharing permissions and deducts one permission of sharing the license, as illustrated in the first embodiment and the second embodiment.

Corresponding to the method embodiments above, various apparatuses are provided herein.

Figure 8:
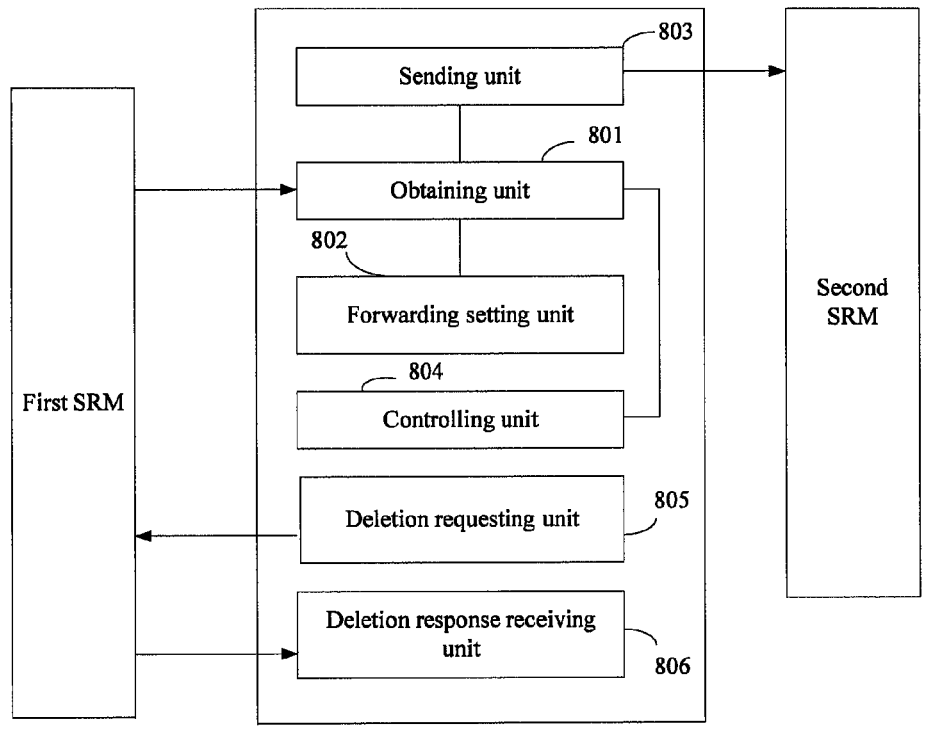
FIG. 8 shows a structure of a first apparatus on a DRM agent according to an embodiment of the present invention.

The first apparatus provided herein refers to DRM agent or a functional entity located in the DRM agent. The apparatus performs the functions of the DRM agent shown in FIG. 1 or FIG. 2. As shown in FIG. 8, the apparatus includes:
    an obtaining unit 801, configured to obtain the license from a first SRM;
    a forwarding setting unit 802, configured to set the license obtained by the obtaining unit 801 to a forwarding state;
    a sending unit 803, configured to send the license obtained by the obtaining unit 801 to a second SRM; and
    a controlling unit 804, configured to deduct one permission of sharing the license.
    Preferably, the apparatus further includes:
    a deletion requesting unit 805, configured to request the first SRM to delete the license; and
    a deletion response receiving unit 806, configured to receive a license deletion response returned by the first SRM.

Figure 9:
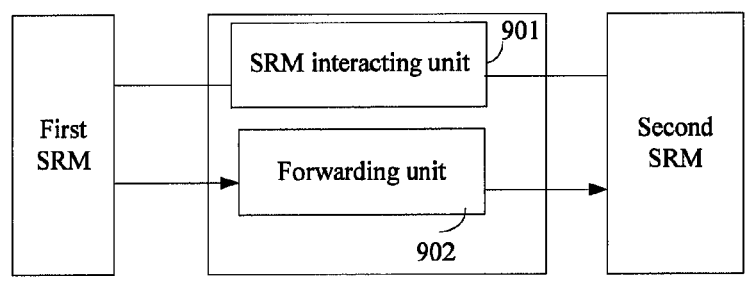
FIG. 9 shows a structure of a second apparatus on a DRM agent according to an embodiment of the present invention.

The second apparatus provided herein refers to DRM agent or a functional entity located in the DRM agent. The apparatus performs the functions of the DRM agent shown in FIG. 3. As shown in FIG. 9, the apparatus includes: an SRM interacting unit 901, configured to trigger a first SRM and a second SRM to perform key negotiation; and a forwarding unit 902, configured to forward the license of the first SRM to the second SRM.

Figure 10:
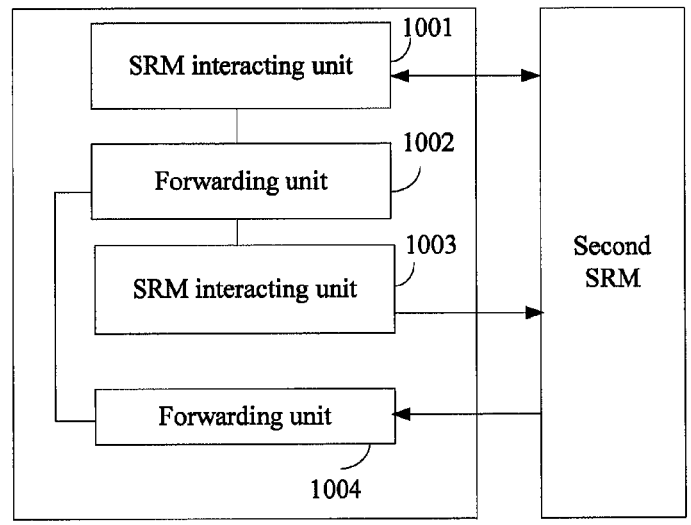
FIG. 10 shows a structure of a third apparatus on a first SRM according to an embodiment of the present invention.

The third apparatus provided herein refers to the first SRM or a functional entity located in the first SRM. The apparatus performs the functions of SRM1 shown in FIG. 3. As shown in FIG. 10, the apparatus includes:
    a key negotiating unit 1001, configured to perform key negotiation with the second SRM;
    a processing unit 1002, configured to encrypt partial information or complete information of the license by using a shared key negotiated with the second SRM; and
    a sending unit 1003, configured to send the license to the second SRM.
    Preferably, the apparatus further includes: a deleting unit 1004, configured to delete the local license after confirming that the second SRM receives the license.

Figure 11:
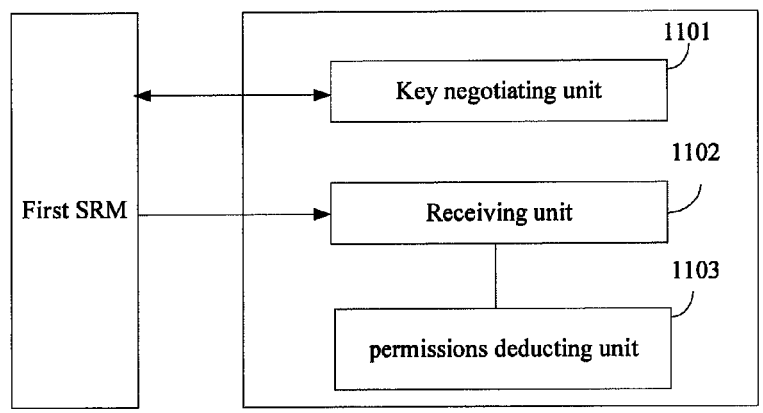
FIG. 11 shows a structure of a fourth apparatus on a second SRM according to an embodiment of the present invention.

The fourth apparatus provided herein refers to the second SRM or a functional entity located in the second SRM. The apparatus performs the functions of SRM2 shown in FIG. 3. As shown in FIG. 11, the apparatus includes:
    a key negotiating unit 1101, configured to perform key negotiation with a first SRM;
    a receiving unit 1102, configured to receive the license sent by the first SRM; and
    a permissions deducting unit 1103, configured to deduct one operation permission after the receiving unit 1102 receives a correct license.

Figure 12:
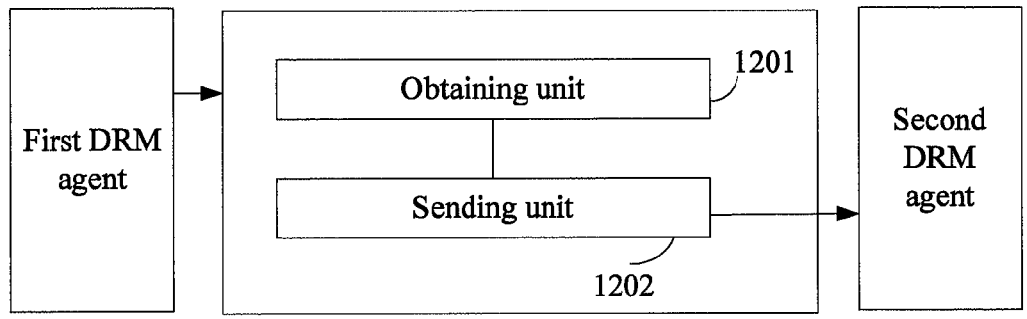
FIG. 12 shows a structure of a fifth apparatus on an RI or subscriber manager according to an embodiment of the present invention.

The fifth apparatus provided herein refers to RI or subscriber manager, or a functional entity located in the RI or subscriber manager. The apparatus performs the functions of the RI shown in FIG. 5. As shown in FIG. 12, the apparatus includes:
    an obtaining unit 1201, configured to obtain the license of a first SRM from a first DRM agent; and
    a sending unit 1202, configured to: send the license to a second DRM agent, and submit the license to a second SRM through the second DRM agent.

Figure 13:
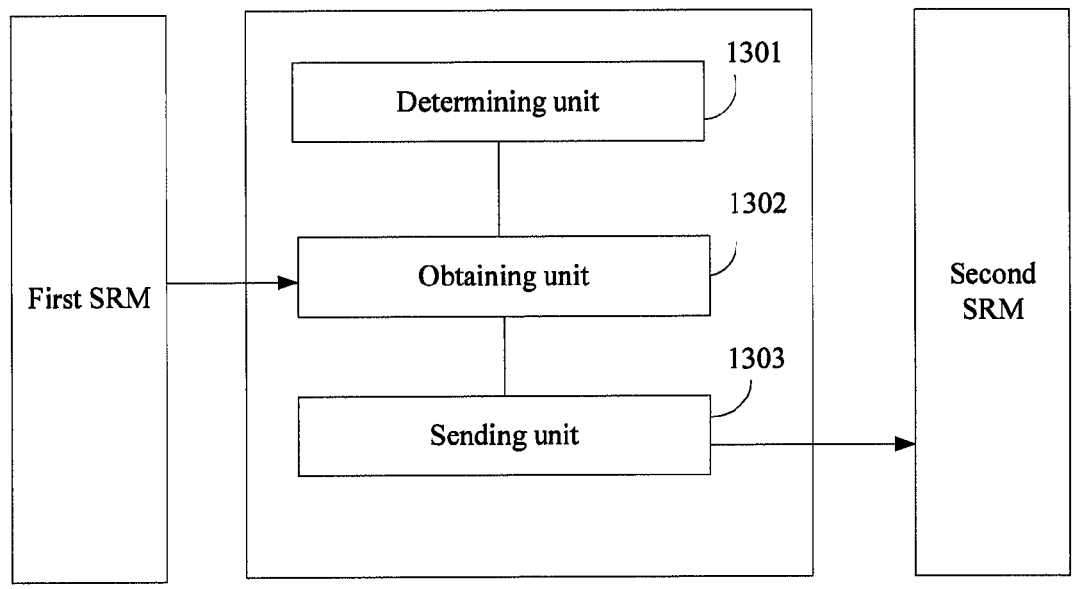
FIG. 13 shows a structure of a sixth apparatus on a DRM agent according to an embodiment of the present invention.

The sixth apparatus provided herein refers to DRM agent or a functional entity located in the DRM agent. The apparatus performs the functions of the DRM agent shown in FIG. 6 or FIG. 7. As shown in FIG. 13, the apparatus includes:
    a determining unit 1301, configured to determine whether a first SRM and a second SRM belong to the same subscriber;
    an obtaining unit 1302, configured to obtain the license from the first SRM if the determining unit 1301 determines that the first SRM and the second SRM belong to the same subscriber; and
    an executing unit 1303, configured to send the license obtained by the obtaining unit 1302 to a second SRM.

It should be noted that the embodiments above suppose that the license is shared between two SRMs. Undoubtedly, persons skilled in the art understand that the embodiments of the present invention are applicable to sharing of a license between three or more SRMs. The embodiments of the present invention are also applicable to sharing a license on an SRM of one DRM agent with another DRM agent.

Persons of ordinary skilled in the art understand that all or part of the steps of the method in the embodiments of the present invention may be implemented by a program instructing relevant hardware. The program may be stored in a computer readable storage medium. When the program runs, the corresponding steps in the foregoing method are performed. The storage medium may be ROM/RAM, magnetic disk, or CD-ROM.

Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

The invention claimed is:

1. A method for moving a license between Secure Removable Media (SRM), comprising:
    initiating, by a Digital Rights Management (DRM) agent on a device, a process of moving a license from a SRM agent of a first SRM connected to the device to a SRM agent of a second SRM connected to the device;
    obtaining, by the DRM agent, the license from the SRM agent of the first SRM, and after obtaining the license from the SRM agent of the first SRM, setting, by the DRM agent, the license obtained by the DRM agent from the SRM agent of the first SRM to a forwarding state locally for the DRM agent based on the initiating, by the DRM agent, the process of moving the license from the SRM agent of the first SRM to the SRM agent of the second SRM, the forwarding state indicating that the license is to be moved to the SRM agent of the second SRM and the license not being available to the DRM agent for consuming contents by the device;

deducting, by the DRM agent, a moving permissions number in state information of the license by one;

sending, by the DRM agent, a license installation request message to the SRM agent of the second SRM, wherein the license installation request message comprises the license, and wherein the step of deducting is performed by the DRM agent only once in the process of moving the license from the SRM agent of the first SRM to the SRM agent of the second SRM.

2. The method of claim 1, wherein:
the method further comprises: triggering, by the DRM agent, the SRM agent of first SRM to delete the license.

3. The method of claim 1, further comprising: deleting, by the DRM agent, the license in local.

4. The method of claim 1, further comprising:
keeping, by the DRM agent, a log in the forwarding process, wherein the log comprises one or more of a operation type, a current state, a license identifier, an identifier of the first SRM, a first handle on the first SRM corresponding to the license, an identifier of the second SRM, or a second handle on the second SRM corresponding to the license;

when the moving of the license is interrupted, the method further comprises:
continuing, by the DRM agent, sending the license installation request message to the SRM agent of the second SRM according to the log; or
recovering, by the DRM agent, the license on the SRM agent of the first SRM according to the log.

5. The method of claim 1, wherein the sending of a license installation request message to the SRM agent of the second SRM by the DRM agent comprises:
sending, by the DRM agent, a license installation request message to the SRM agent of the second SRM through another DRM agent.

6. A non-transitory computer-readable storage medium storing computer readable code comprising a program to implement the method according to claim 1.

7. An apparatus to implement a Digital Rights Management (DRM) agent for moving a license, comprising:
a processor configured to execute:
initiating a process of moving a license from a Secure Removable Medium (SRM) agent of a first SRM to a SRM agent of another SRM directly;
obtaining the license from the SRM agent of the first SRM;
setting after obtaining the license from the SRM agent of the first SRM, based on the initiating of moving the license from the SRM agent of the first SRM to the SRM agent of the second SRM, the license obtained by the DRM agent from the SRM agent of the first SRM to a forwarding state for the DRM Agent, wherein once the license is set to the forwarding state the license needs to be moved to another SRM and is not available to the DRM agent for consuming contents;
sending a license installation request message to the SRM agent of the second SRM, wherein the license installation request message comprises license;
deducting a moving permissions number in state information of the license by one, wherein the step of deducting is performed by the DRM agent only once between the step of initiating and the step of sending.

8. The apparatus of claim 7, the processor further executes:
requesting the SRM agent of first SRM to delete the license; and
receiving a license deletion response returned by the SRM agent of first SRM.

9. The apparatus of claim 7, the processor further executes:
keeping a log in the forwarding process, wherein the log comprises one or more of a operation type, a current state, a license identifier, an identifier of the first SRM, a first handle on the first SRM corresponding to the license, an identifier of the second SRM, or a second handle on the second SRM corresponding to the license; and
when the moving of the license is interrupted, the processor further executes:
continuing sending the license installation request message to the SRM agent of the second SRM according to the log if the moving of the license is interrupted; or
recovering the license on the SRM agent of the first SRM according to the log if the moving of the license is interrupted.

* * * * *